April 14, 1953  J. M. LACHER  2,634,471
CABLE TAKE-UP DEVICE
Filed Aug. 24, 1948

Inventor:
John M. Lacher
By Chritton, Schroder, Merriam & Hofgren
Attorneys

Patented Apr. 14, 1953

2,634,471

UNITED STATES PATENT OFFICE 2,634,471

CABLE TAKE-UP DEVICE

John M. Lacher, Omaha, Nebr., assignor to Lacher Products Inc., a corporation of Nebraska Application August 24, 1948, Serial No. 45,843

3 Claims. (Cl. 24—71.1)

1

This invention relates to take-up devices for adjusting the length of a flexible cord, such as the stranded cables on the brakes of automobiles. Steel cables are normally attached to the devices which they operate by means of shackles which usually have some sort of adjusting means at their ends to take care of stretch. However, it is usually difficult to operate the adjusting mechanism and frequently it is placed in a position that is not conveniently accessible.

The primary object of the present invention is to provide a very simple and inexpensive take-up device which may be installed in any convenient place along the length of the cable without disturbing the end fastenings.

A further object of the invention is to provide a device which may be adjusted readily, after it has been installed, and may be locked so that its adjustment will not be disturbed by loosening due to vibration or long use.

The invention is illustrated in the preferred embodiment in the accompanying drawings, in which—

Figure 1:
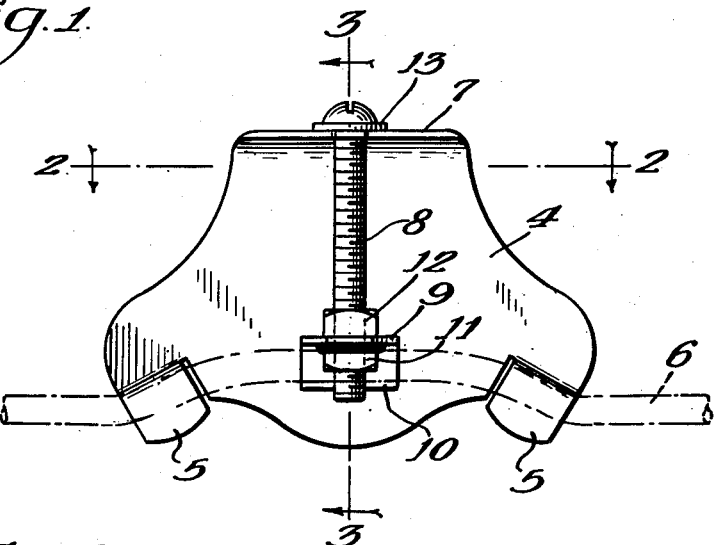
Figure 2:
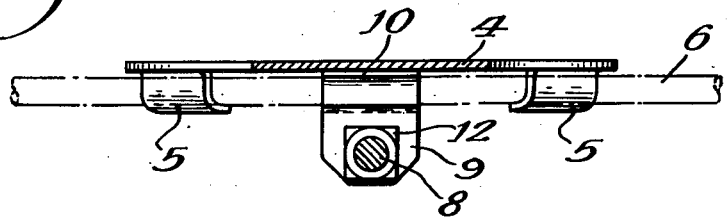
Figure 3:
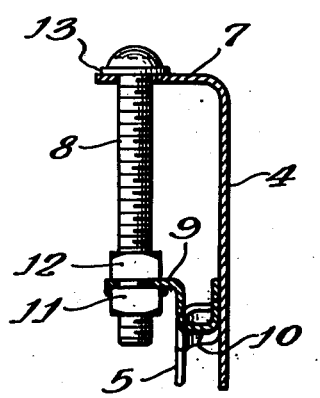

Figure 1 is a front elevational view of the improved take-up device; Fig. 2, a sectional view taken as indicated at line 2—2 of Fig. 1; and Fig. 3, a sectional view taken as indicated at line 3—3 of Fig. 1.

In the embodiment illustrated, a base member 4 is provided with offset arms 5 by striking the metal outwardly and downwardly, as viewed in Fig. 1, to form an arcuate groove to receive a cable 6 indicated by dot and dash lines in Figs. 1 and 2. The upper portion of the base member has an outwardly struck ear 7 which has a hole to receive loosely a tensioning bolt 8.

A slide-member 9 has an inwardly and upwardly extending hook portion 10 to engage the cable 6 between the arms 5. The slide-member has an ear which is perforated to receive the bolt 8. If desired, a lower nut 11 may be welded to the ear and a lock nut 12 provided to secure the bolt against turning after it has been set in an adjusted position. On the other hand, a lock washer 13 may be used under the head of the bolt to serve the same purpose.

To install the device it is merely necessary to straddle the cable 6 with the arms 5 and the hook portion 10 may be slipped around and under the cable between the arms, due to the loose fit between the bolt and the ear 7. The screw may then be turned to draw up the slide member 9, which will form a bight in the cable and thereby reduce its length. When the desired amount of slack is taken up the bolt may be locked and the device will require no further attention.

The foregoing detailed description is given for clearness of understanding only and no unnecessary limitations should be understood therefrom, for some modifications will be obvious to those skilled in the art.

2

I claim:

1. A cable take-up device comprising a base member formed from a single flat piece of sheet material and having the general shape of a truncated triangle, a cable guide member at each base corner of said base member, said guide members being integral with said base member and taking the form of a finger first extending laterally of the plane of said base member, thence parallel with and outwardly of said base member to open generally outwardly from the base of said base member, an apertured flange at the truncated end of said base member integral therewith and extending laterally out of the plane of said member to the same side as said guide members, a screw extending freely through the aperture in said flange, and a hook member threadedly engaging said screw and opening toward the truncated end of said base member to form a bight in a cable threaded between said guide means and said hook member upon adjustment of said screw.

2. A cable take-up device according to claim 1, in which the channel of each of said cable guide members is inclined in the direction of the cable when said screw is adjusted to form a bight in the cable.

3. A cable take-up device comprising: an open-sided base member formed from a single flat piece of sheet material and having an integral apertured flange at one margin; means integral with said base member forming a pair of cable guiding channels at the corners of the margin of said base member opposite said flange and opening outwardly with respect to the flange to slidably receive a cable; said channels being shaped to encircle by at least 180° a cable received therein; a threaded adjusting bolt projecting freely through the aperture in the flange toward said guiding channels; and hook-like slide means threadedly engaging said adjusting bolt to engage the opposite side of a cable from that engaged by said cable guiding channels so as to form a bight in the cable as said slide means is drawn toward the flange by turning the adjusting bolt.

JOHN M. LACHER.

References Cited in the file of this patent

UNITED STATES PATENTS

| Number | Name | Date |
|--------|------|------|
| 406,623 | Brinkerhoff | July 9, 1889 |
| 454,111 | Coupe | June 16, 1891 |
| 1,276,702 | Anderson | Aug. 27, 1918 |
| 2,049,074 | Mott | July 28, 1936 |
| 2,188,937 | Bertram | Feb. 6, 1940 |
| 2,444,743 | Melidoni | July 6, 1948 |
| 2,449,031 | Woodson | Sept. 7, 1948 |
| 2,456,895 | Sattler | Dec. 21, 1948 |
| 2,510,622 | Denis | June 6, 1950 |